United States Patent Office 3,375,286
Patented Mar. 26, 1968

3,375,286
PREPARATION OF 1,1-DICHLOROCYCLO-
PROPANE COMPOUNDS
Howard J. Platte, Groves, Tex., assignor to Texaco Inc.,
New York, N.Y., a corporation of Delaware
No Drawing. Filed Oct. 4, 1965, Ser. No. 492,936
4 Claims. (Cl. 260—650)

ABSTRACT OF THE DISCLOSURE

A method of producing 1,1-dichlorocyclopropane hydrocarbon compounds comprising contacting in the presence of benzyl alcohol an olefinic hydrocarbon at a temperature between about 60–110° C. with an alkali metal hydroxide and chloroform utilizing a mole ratio of olefin to chloroform to alkali metal hydroxide of between about 1:2:1 and 10:10:1 wherein the water content during said contacting is maintained at less than 0.1 wt. percent. The products of the method are useful as hardening agents for elastomers, fire retardants, fungicides and insecticides.

---

This invention relates to a novel method of preparing in relatively high yields 1,1-dichlorocyclopropane and derivatives thereof from olefins.

The 1,1-dichlorocyclopropane compounds are useful as hardening agents for elastomers, fire retardants, fungicides and insecticide.

In the past, 1,1-dichlorocyclopropane compounds were prepared by reacting a metal alcoholate and chloroform with an olefin under anhydrous conditions. The yields in this prior process were satisfactory but required the employment of relatively expensive alcoholates as reactants. In another prior method of preparing dichlorocyclopropane compounds an olefin was reacted with an alkali metal hydroxide under hydrous conditions, however, the yield of dichlorocyclopropane was very poor, e.g., of the order of 0.5 wt. percent.

In contrast to the foregoing, I have discovered, and this constitutes my invention, a novel method of preparing 1,1-dichlorocyclopropane compounds in relatively high yields utilizing relatively inexpensive reactants. Specifically, my invention comprises the preparation of 1,1-dichlorocyclopropane compounds of the formula:

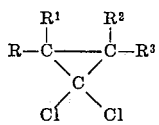

where R, $R^1$, $R^2$ and $R^3$ are the same or different members selected from the group consisting of hydrogen and alkyl, alkaryl, aralkyl and aryl hydrocarbons of from 1 to 20 carbons comprising contacting under substantially anhydrous conditions an olefin of the formula:

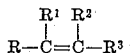

where R, $R^1$, $R^2$ and $R^3$ are as heretofore defined with chloroform and an alkali metal hydroxide in the presence of benzyl alcohol.

The reactant amounts employed in the method of invention are advantageously a mole ratio of olefin to chloroform to alkali metal hydroxide of between about 1:2:1 and 10:10:1, preferably between about 3:3:1 and 5:5:1. The reaction temperature is normally between about 60 and 110° C., preferably between about 70 and 100° C., and, in any case, it should be sufficient with adjustment of reaction pressure, if required, to permit the continuous removal of water formed in the reaction as an azeotrope with chloroform. The amount of benzyl alcohol employed in the total reaction mixture should be sufficient to place and maintain the employed alkali metal hydroxide in solution. This amount is normally between about 10 and 70 wt. percent of the reaction mixture although lower and higher amounts may be employed.

As heretofore stated, the reaction should be conducted under essentially anhydrous conditions. This means that at any given point in the reaction between olefin, chloroform and alkali metal hydroxide, the water content of the reaction mixture should not be permitted to rise above 0.1 wt. percent of the reaction mixture. The essentially anhydrous condition is accomplished in part by utilizing initial reaction components of a substantially anhydrous character. However, it is primarily accomplished by the continual removal of the water by-product formed in the reaction via azeotropic distillation with chloroform, adjusting the temperature and pressure within the parameters of the reaction to permit such distillation.

The formed 1,1-dichlorocyclopropane compound is separated from the final reaction mixture by standard means such as fractional distillation.

Under the preferred operating conditions, the benzyl alcohol and metal hydroxide are added as a solution to the chloroform-olefin mixture at the reaction temperature. Addition of the alcoholic-metal hydroxide solution should be restricted to a rate which would prevent any build-up of water of reaction in the reactor under the heat capacity limitation of the equipment. For example, one mole of caustic per unit time may be added for each mole of water which can be removed per said unit time by the azeotropic action of the chloroform.

Examples of suitable olefins contemplated herein are olefinic hydrocarbons of 2 to 20 carbons such as alpha-methylstyrene, styrene, 1-hexene, isobutylene, diisobutylene, 3-heptene, 4-butylvinylbenzene, and 4-phenyl-2-butene.

Examples of the alkali metal hydroxides contemplated herein are sodium hydroxide and potassium hydroxide.

Specific examples of the 1,1-dichloropropane products contemplated herein having the following general formula:

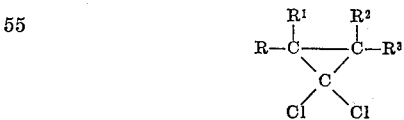

are where (1) R=phenyl, $R^1$=methyl, $R^2$ and $R^3$=hydrogen; (2) R, $R^1$ and $R^2$=hydrogen and $R^3$=n-butyl; (3) R and $R^1$=hydrogen, and $R^2$ and $R^3$=methyl; (4) R and $R^1$=methyl, $R^2$=hydrogen and $R^3$=t-butyl; (5) R=ethyl, $R^1$ and $R^2$=hydrogen and $R^3$=n-propyl; (6) R=phenyl, $R^1$=hydrogen and $R^2$ and $R^3$=hydrogen; and (7) R=tolyl, $R^1$ and $R^2$=hydrogen and $R^3$=methyl.

The method of the invention may be further described by the following chemical equations utilizing sodium hydroxide as the alkali metal hydroxide.

(1) $$\text{NaOH} + 2\text{CHCl}_3 \xrightarrow{\text{benzyl alcohol}} :\text{CCl}_2 + \text{NaCl} + \text{H}_2\text{O}-\text{CHCl}_3$$

(2) 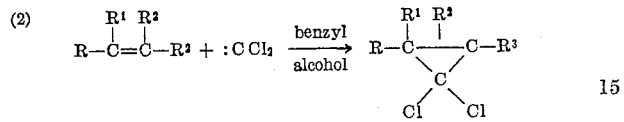

In the foregoing equations R, $R^1$, $R^2$ and $R^3$ are as heretofore defined.

Two critical features in the foregoing process are the maintenance of the water content of the total reaction mixture below about 0.1 wt. percent and the use of the benzyl alcohol as solubilizing diluent. If substantially higher water contents are permitted and/or liquid diluents such as liquid n-alkanols are employed, the yield of 1,1-dichlorocyclopropane compound is sharply reduced.

The following examples further illustrate the invention but are not to be considered as limitations thereof:

Example I

This example illustrates the preparation of 1,1-dichloro-2-methyl-2-phenylcyclopropane.

The reaction apparatus employed was a 500 mls. round bottom flask fitted with a thermometer, stirrer, water cooled reflux condenser having a desiccator tube fitted at its exit to the atmosphere and so constructed that the water and chloroform removed from the reaction mixture can be collected with the water being periodically discarded and the chloroform returned to the reaction mixture. The reaction flask is also fitted with a dropping funnel for the introduction of the alkali metal hydroxide-alcohol solution.

To the aforedescribed reactor there was charged 35.4 g. of α-methylstyrene and 118.5 g. $CHCl_3$. The stirrer was started and the $CHCl_3$-olefin mixture was heated and maintained at 160–216° F. A solution consisting of 5.61 g. of KOH dissolved in 100 mls. of benzyl alcohol was added dropwise at a rate of 1 to 3 mls./min. to the heated, stirred olefin-$CHCl_3$ mixture with formed water being continuously removed from the reaction mixture as a $CHCl_3$-$H_2O$ azeotrope. The removed $CHCl_3$ was recovered and continuously returned to the reaction mixture and the removed water was discarded. This addition was continued for a period of about 2½ hrs. and refluxing, stirring and water removal were continued for an additional half hour after termination of KOH addition. The final reaction mixture having a water content less than 0.1 wt. percent was then extracted with three 100 g. portions of water and the water washed organic layer was analyzed by vapor phase chromatography. The analysis indicated that 1,1-dichloro-2-methyl-2-phenylcyclopropane had formed in a yield of 45 mole percent based on the caustic charge.

Example II

This example further illustrates the method of the invention.

The apparatus described in Example I was employed. To the flask there was charged 35.4 g. of alpha-methylstyrene and 118.5 g. chloroform. Stirring of the olefin-$CHCl_3$ mixture was initiated and the mixture was heated to a temperature in the range of 161–186° F. During the heating period a solution of 3.98 g. of NaOH dissolved in 200 mls. of benzyl alcohol was added dropwise to the olefin-$CHCl_3$ mixture at a rate of 1 to 3 mls./min. for a period of 2½ hrs. The formed water was continuously removed during the addition period in order to maintain the water content in the reaction mixture below 0.1 wt. percent at all times. At the end of the reaction period the final reaction mixture was water washed with three 100 mls. portions of water, the aqueous portions being discarded. The water washed organic mixture was analyzed by vapor phase chromatography indicating the presence of 35 mole percent of 1,1-dichloro-2-methyl-2-phenylcyclopropane based on the caustic reactant.

Example III

This example illustrates the criticality of continuously removing water in the process of the invention, that is, maintaining the water content in the reaction mixture below about 0.1 wt. percent and the need to have benzyl alcohol as diluent.

The procedure employed was essentially of the type described in Example I with the exception that in Runs A and B water was not removed from the reaction and the water content in the final reaction mixture was 3.8–4.0 wt. percent. Further, 1,2-di-methoxyethane was employed as diluent rather than benzyl alcohol. The particular reaction conditions, reactants and yields are reported below in Table I:

TABLE I

|  | Run A | Run B |
|---|---|---|
| Charge Stock: |  |  |
| α-methylstyrene, g | 118 | 118 |
| $CHCl_3$, g | 119 | 119 |
| NaOH, g |  | 42.8 |
| KOH, g | 60 |  |
| Benzyl Alcohol, g | ---- | ---- |
| 1,2-dimethoxyethane, g | 174 | 174 |
| Reaction Conditions: |  |  |
| Heat-up: |  |  |
| Temp., °F | 82-191 | 140-196 |
| Time, min | 80 | 80 |
| Addn of $CCl_2$ Source: |  |  |
| Temp., °F | 82-132 | 140-143 |
| Time, min. (part of heat-up) | 25 | 35 |
| Reaction: |  |  |
| Temp., °F | 180-191 | 196-197 |
| Time, min. (additional to heat-up) | 300 | 390 |
| Yield, mole percent (1,1-dichloro . . . cyclopropane) (basis carbene source) | 6.7 | 15 |

In comparing the foregoing with the yields in Examples I and II the criticality of a substantially anhydrous process and the use of benzyl alcohol is demonstrated.

I claim:

1. A method of preparing a 1,1-dichlorocyclopropane compound of the formula:

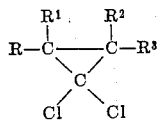

where, R, $R^1$, $R^2$ and $R^3$ are members selected from the group consisting of hydrogen and alkyl, aryl, alkaryl and aralkyl of from 1 to 20 carbons comprising contacting in the presence of benzyl alcohol an olefin of the formula:

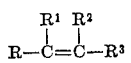

where R, $R^1$, $R^2$ and $R^3$ are as heretofore defined with an alkali metal hydroxide and chloroform at a temperature between about 60 and 110° C. in a mole ratio of olefin to chloroform to alkali metal hydroxide between about 1:2:1 and 10:10:1, said contacting conducted under temperature and pressure conditions wherein the water content of said reaction mixture at all times is maintained at less than 0.1 wt. percent by removing water in the reaction mixture as a chloroform-water azeotrope.

2. A method in accordance with claim 1 wherein said contacting comprises adding incrementally a solution of said alkali metal hydroxide and benzyl alcohol to a mixture of said olefin and chloroform, said benzyl alcohol being present in the total reaction mixture in an amount of between about 10 and 70 wt. percent.

3. A method in accordance with claim 2 wherein said olefin is alpha-methylstyrene, and said alkali metal hydroxide is sodium hydroxide.

4. A method in accordance with claim 2 wherein said olefin is alpha-methylstyrene, and said alkali metal hydroxide is potassium hydroxide.

References Cited

UNITED STATES PATENTS

| | | | |
|---|---|---|---|
| 2,967,181 | 1/1961 | Herrick et al. | 260—648 |
| 3,264,359 | 8/1966 | Dickerson et al. | 260—648 |
| 3,265,743 | 8/1966 | Robinson | 260—648 |

OTHER REFERENCES

Dale et al.: J. Org. Chem., vol. 24, pp. 955 to 7 (1959).

LEON ZITVER, *Primary Examiner.*

BERNARD HELFIN, *Examiner.*

M. JACOB, *Assistant Examiner.*